Figure 1:
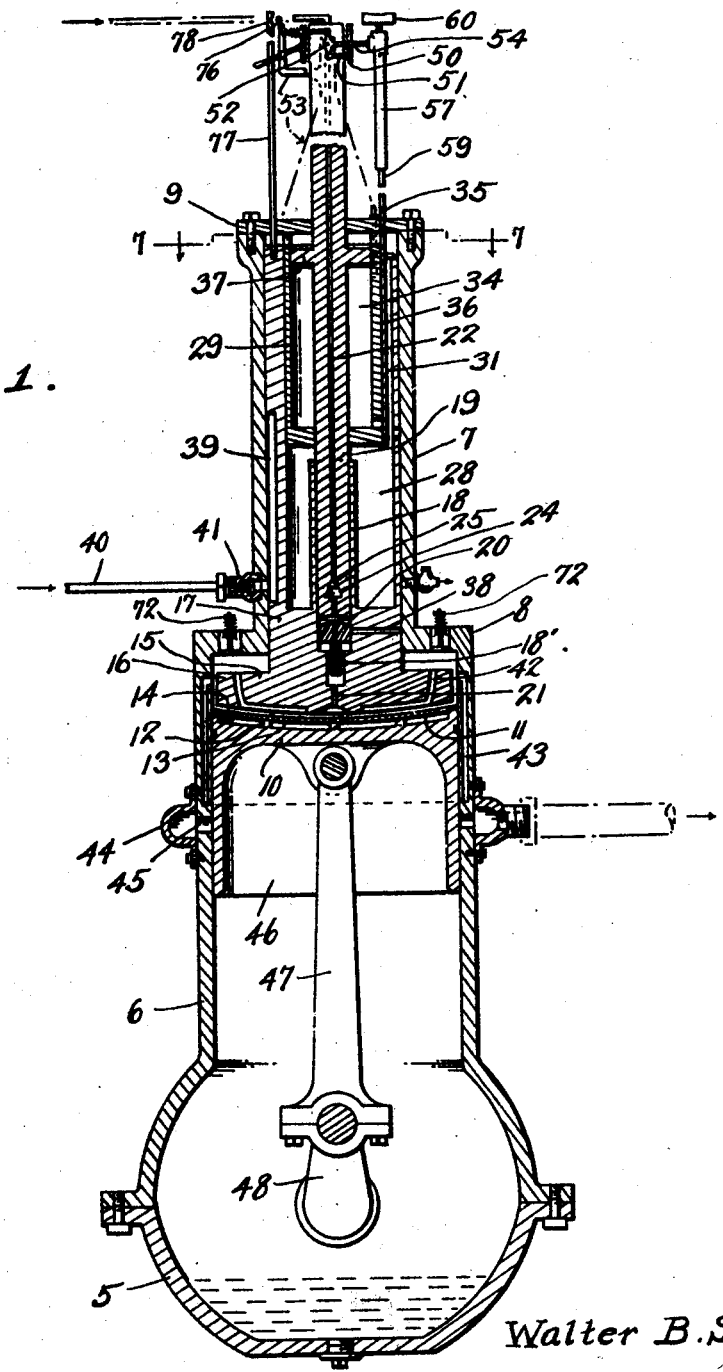

May 7, 1929.  W. B. SANDS  1,711,906
TWO-CYCLE INTERNAL COMBUSTION ENGINE
Filed Feb. 29, 1928   4 Sheets-Sheet 1

Inventor
Walter B. Sands
By Clarence A. O'Brien
Attorney

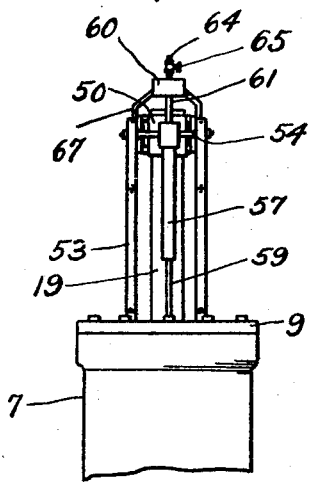
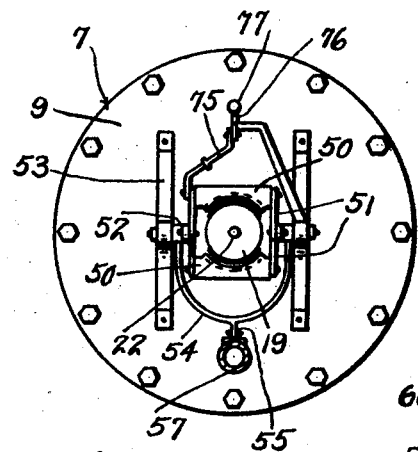
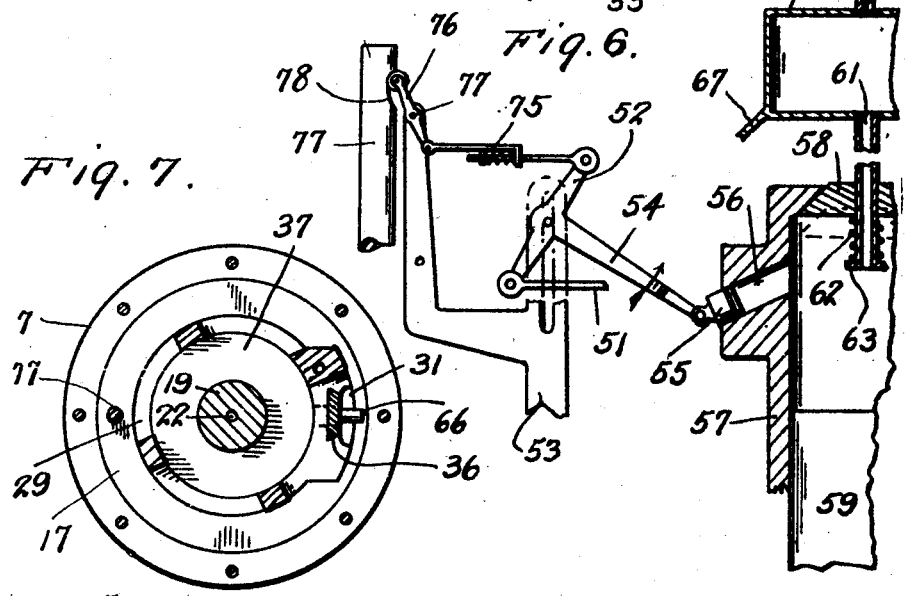

Patented May 7, 1929.

1,711,906

UNITED STATES PATENT OFFICE.

WALTER B. SANDS, OF CHINOOK, MONTANA.

TWO-CYCLE INTERNAL-COMBUSTION ENGINE.

Application filed February 29, 1928. Serial No. 257,909.

This invention is an improvement upon two cycle, internal combustion engines. It is designed to burn any kind of gas or liquid fuel with only such changes as are necessary to vary the flow of fuel to the combustion chamber. Ignition is effected by compression of fuel and air in a small chamber thus dispensing with electric and other igniters and permitting any desired initial compression in the main combustion chamber, the working cylinder. The working parts are so disposed so that combustion takes places in the center of the combustion chamber and the cylinder walls, during combustion protected from the flames of combustion by an air curtain thereby conserving the heat for useful work and reducing the ill results of radiation. By further reducing radiation by insulation of the chamber walls by air slots parallel with and adjacent to the chamber walls. By so disposing the working parts that no valves are connected with the working cylinder at the time of combustion.

By eliminating all valves this superheated walls presenting a uniform and unbroken chamber wall, thereby permitting higher temperatures in the working chamber. Introducing the fuel and discharging the burned gases uniformly around the cylinder wall thereby equally heating all corresponding parts of the cylinder and piston wall.

By presenting a comparatively thin combustion chamber wall thereby facilitating rapid changes of temperature with a minimum of heat losses. By thoroughly and promptly scavenging the combustion chamber after each working stroke. By eliminating all gears. By effecting a high compression in the ignition tube in a very simple and effective manner, capable of variation automatically or mechanically to best meet requirements. By automatically timing the ignition in a most simple manner, easily altered mechanically when starting. By reducing the weight and cost per horsepower without sacrifice of stability. By reducing the number and speed of frictional parts. By permitting the starting of the engine on low pressure thereby overcoming much of the difficulty in starting most high pressure engines.

Other advantages of construction will appear as the engine and its working parts are hereafter explained.

Another very important object of the invention resides in the provision of an engine wherein the various parts for carrying out the two cycles are so inter-related and constructed as to cause the engine to run in a smooth and reliable manner.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical section through an engine embodying the features of my invention showing the same about to fire.

Figure 2:
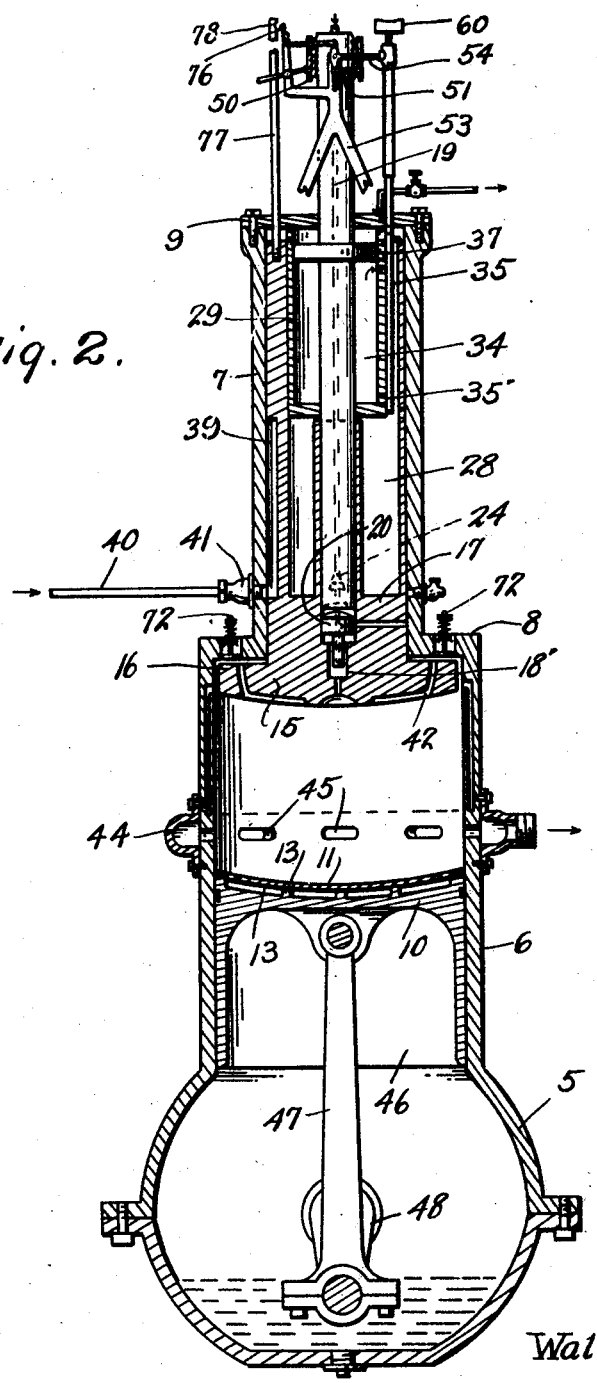
Figure 3:
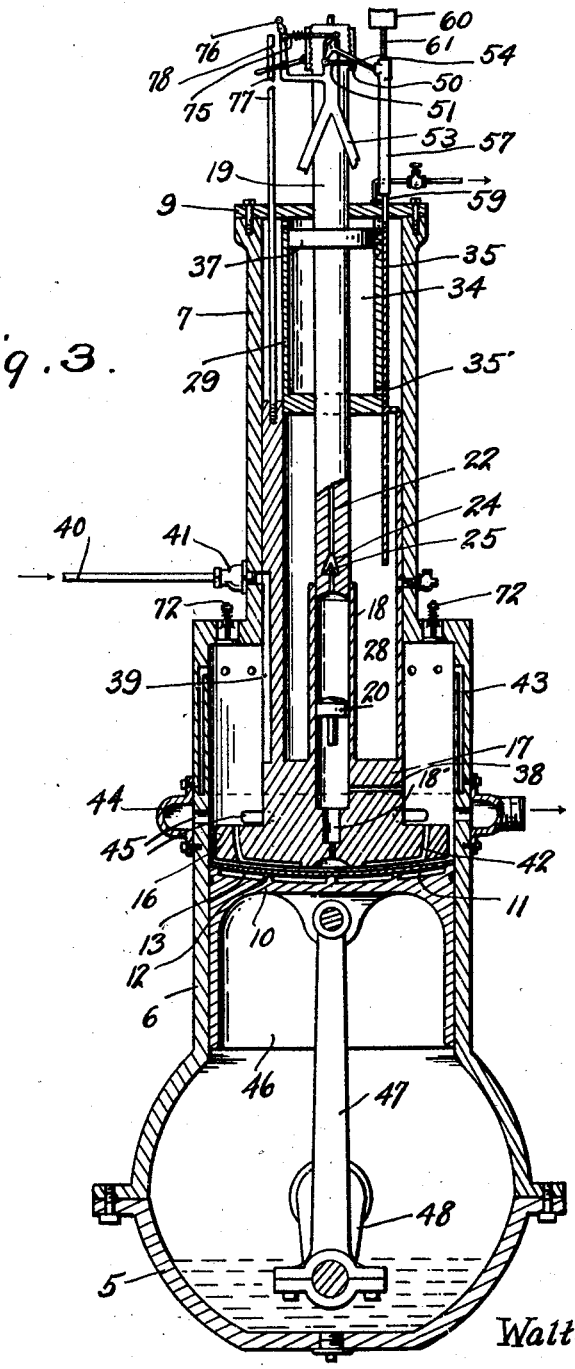

Figure 2 is a similar view showing the main piston at the end of its power stroke, Figure 3 is a similar view showing the loose auxiliary piston at the end of its downward stroke, Figure 4 is a top plan view of the engine, Figure 5 is a fragmentary side elevation showing the mechanism mounted on the head of the engine, Figure 6 is a vertical section therethrough, Figure 7 is a transverse section taken substantially on the line 7—7 of Figure 1, and Figure 8 is a diagrammatic view showing a check mechanism which may be used in conjunction with the auxiliary loose piston.

Referring to the drawings in detail, it will be seen that the numeral 5 denotes the crank case with a cylinder 6 rising therefrom. The upper end of the cylinder 6 merges into reduced cylindrical extension 7 by means of a shoulder 8. A head 9 is bolted or otherwise secured on the upper end of the extension 7. A power piston 10 is mounted for reciprocation in the cylinder 6 and the head of this piston has a plate 11 mounted thereon held in spaced relation thereto by spacing studs 12 or in any other suitable manner so as to form an air pocket 13 therebetween.

At the periphery of the plate 11 there are provided openings 14 communicating with the air pocket 13. A loose piston 15 includes a head 16 with an annular space between it and the cylinder walls for reciprocation in the cylinder 6 and a reduced shank 17 for reciprocation in the cylindrical extension 7. The shank 17 is provided with a longitudinally extending central bore 18 in which is located an elongated compression piston 19 and a floating piston 20. The bore 18 is reduced in diameter at its lower end as is indicated at 18' and merges into a passage 21 leading from the head 16.

The piston 20 is formed with a longitudinally extending fuel conducting bore 22. The bore 22 adjacent its lower end is provided with a cone shaped enlargement 24 in which is movable a cone shaped valve 25 which when raised closes off the bore.

The shank 17 is formed in its lower portion with a cylindrical chamber telescopically receiving a cylinder 29.

The shank 17 is provided with a longitudinally extending passage 31 communicating with the cylindrical chamber 28 and extends upwardly for communication with a chamber 34 formed by wall 29 through a port 35 in a plane 36 slidable in the head 9.

An abutment 37 extends around the piston 19 into the chamber 34. A transverse radial passage 38 extends from the lower portion of the bore 18 through the exterior of the shank and is closed at its inner end by the floating piston 20 and the wall of the cylinder 7 when the parts are disposed in the position shown in Figure 1 ready to fire.

The shank 17 is provided with a longitudinally extending channel 39 constituting its outer wall in communication with a valve conduit 40 leading through the cylindrical extension 7 immediately above the shoulder 8 and having a check valve 41 therein. This pipe 40 leads from a suitable source of compressed air. The piston head 16 is formed with passages 42 leading from the top thereof downwardly and then inwardly toward the center and then terminating a distance from the center. The cylinder 6 is formed in its upper part with an annular air chamber 43 opening interiorly of the cylinder at the top thereof. An exhaust manifold 44 is disposed about the intermediate portion of the cylinder 6 communicating with ports 45 in the cylinder which are closed by the apron 46 of the piston 10 when in a raised position and are open to the interior of the cylinder when the piston 10 is at the end of its power stroke as shown in Figure 2.

A connecting rod 47 from the piston 10 is engaged with a crank of a crank shaft 48 rotatable in the crank case 5.

The compression piston 19 extends through an opening in the head 9 and terminates a distance thereabove. Clamp blocks 50 are disposed one on each side of the upper end of the piston 19 and have links 51 leading inwardly therefrom and connected to levers 52 rockable in bracket 53 so that when the lever is turned in one direction the blocks are clamped on the piston 19 to hold the same and when turned in an opposite direction the blocks are released therefrom.

The lever 52 is operated by a crank 54 leading therefrom and terminating in a piston 55 operating in a cylinder 56 on a cylinder 57 the upper end of which is closed by a valve 58 and in which extends a plunger 59 which plunger extends upwardly from the plate 36. An expansion tank 60 has a tube 61 depending therefrom through an opening in the valve 58 and a spring 62 is disposed about the tube 61 impinging against a shoulder 63 on the end thereof and the valve 58 to normally hold the valve closed. A tube 64 leads upwardly from the tank 60 and has a valve 65 therein.

The lever 52 is connected by an arm 75 linked to a lever 76 pivoted at 77 having an eccentric around the pivot which enters the groove 78 in the extended portion of the cylinder wall of the shank 17 and preventing the piston 16 from following piston 10 as it starts downward. The air exhausting through valve 65 releases the piston 55 restoring the levers 52 and 76 to normal position thereby simultaneously locking piston 19 and releasing shank 17 and piston 16.

Both pistons are free to move upward at any time. The shank 17 has an arm rigidly attached at right angles extending out and then downward to constitute a dash pot with a crank rod extending upward from the main crank shaft as shown in Figure 8. A pin 66 extends laterally from the plate 36 and is adapted to be engaged by the upper end of the shank 17 as clearly indicated in Figure 7. The tank 60 is supported by suitable brackets 67.

In considering the operation of the engine, I will start with the parts disposed as illustrated in Figure 1 wherein the explosion is taking place in bore extension 18' and conduit 21 causing the air and gas there meeting under high pressure to ignite. Having reached the highest point the piston 10 moves downwardly and the piston 16 is held from following and is soon moved upwardly assuming the position shown in Figure 2.

When the piston 10 reaches the bottom of its power stroke the burnt gases are free to exhaust out through ports 45 into the exhaust manifold 44. As the piston head 16 moves upwardly from the beginning of the compression stroke it compresses the air between the top surface thereof and the shoulder 8 and part of it enters the passages 42.

When the piston 10 reaches the end of its working stroke and uncovers the port 45 the pressure in the main cylinder is relieved and piston 16 is driven downward by gravity, by the pressure in chamber 28 and by the auxiliary pressure through conduit 40 as soon as channel 39 reaches the shoulder of the main cylinder. The compressed air entering through conduit 40 flows downward between the walls of piston 16 and the main cylinder and being in such close contact cools the walls of both escaping through port 45 until piston 10 in its upward stroke closes that port. When the small tube 22 which unites with the air driven from the chamber 38 this commingled gas and air is precipitated against the upper face of piston 10 and there being no escape of this air and gas being of a pressure sufficient to ignite it is fired.

As soon as piston 10 reaches its highest point and piston 16 is held from following it downward by the device shown in Figure 6, an air space is formed between it and piston 16 and the compressed ignited gas and air drive outwardly from the opening in channel 21 thereby communicating their pressure to the opposing surfaces of pistons 10 and 16. Piston 16 having a surface exposed to this upward pressure measured by its total area and a downward pressure measured by the difference of the higher pressure in the cylinder 6 and the lower pressure in chamber 39 will be driven upward and will thereby force the air above it down around its sides to the face of piston 10 and inward to meet the outward flowing fuel from conduit 21. At this meeting point the combustion takes place but so long as piston 16 moves upward there will be an air curtain around the sides of the walls of cylinder 6. The heat from the combustion radiating through the face of the piston 16 to the air in channel 42 will expand it and force more air around the piston to the combustion chamber.

When piston 10 reaches the lower end of its working stroke it uncovers port 45 and the pressure in the main cylinder is relieved. Thereupon the piston 16 is driven down by gravity, by the compressed air in the chamber 30 and after the channel 39 passes the shoulder of the main cylinder by the compressed air coming in through conduit 40 and channel 39. This compressed air flows through the annular passage between the walls of piston 16 and the main cylinder walls and being in close contact tends to cool both in a most efficient manner.

It will be further seen that as piston 19 is held in place at its high point the descent of the shank 17 enlarges the chamber in which is the floating piston 20 tending to create a vacuum but at this time fuel is forced in through conduit 22 under a pressure approximately equal to the pressure in the auxiliary air supply in conduit 40 thereby forcing the floating piston upward in proportion to the amount of fuel admitted. Some burnt gases may, where the fuel feed is light, enter the chamber 18 from below but the channel 38 will soon be uncovered at both ends and as the compressed air through conduit entering above piston 16 will have a greater pressure than the pressure in the main cylinder at the lower end of bore 21 the fresh air will flow through 38 to the lower side of the floating piston and the floating piston, having only a small passage through it will establish itself at equilibrium and serve as a dividing wall between the gas above and the air below it. This equilibrium will be maintained at all times by the floating piston. It is presumed the fuel will gasify from the heat in the chamber walls as soon as it enters but it will start with liquid fuel under extra high pressure.

On the compression stroke approximately the same pressure is generated in the cylinder 18 as in the main cylinder and when the outer end of the channel 38 reaches the shoulder of the main cylinder it is closed and at about the same time the other end of 38 is closed by the floating piston.

Also on the compression stroke pressure is generated in chamber 28 but the initial pressure therein is at or below atmospheric and it has a greater clearance space greater than in the main cylinder, therefore, it does not reach as high a compression as in the main cylinder. The compression in chamber 28 is automatically controlled with certain degrees by a sliding valve 36 working in a portion of the annular slot 35. The valve 36 has a pin which engages with the top of the outer wall of shank 17 at a point in the compression stroke thereby raising the valve 36. It has at a point near the top a passage through it to register with a passage through the stationary wall 7. The stationary structure 7 forms the outer wall of the cylinder 34. The piston therein is a lateral extension of the piston 19. The chamber 34 is connected by the conduit 78 to the atmosphere and remains at approximately atmospheric pressure.

When the valve 36 moving upward through the contact of pin 66 with the wall of the shank 17 compresses the air in cylinder 62 and the communicating cylinder 56 sufficiently to release the piston 19 the air pressure over the extension piston 37 having an exposed area several times as great as the area of the piston 19 overcomes the upward pressure of the gas and air in the floating piston chamber and drives the piston 19 downward with great force thereby compressing the gas and air on both sides of the floating piston and driving both gas and air through the respective passages 22 and 18′ into the conduit 21. The lower end of conduit 21 being then closed by contact with the face of piston 10 now becomes an ignition chamber by reason of the high pressure of the mixed gas and air therein.

As soon as the piston 10 starts downward it opens the conduit 21 and the ignited fuel rushes out between the faces of the pistons 10 and 16 toward the main cylinder walls.

But before this fuel reaches the cylinder walls it comes in contact with the compressed air rushing downward from the upper side of piston 16 and combustion takes place before the gas reaches the cylinder walls. The combustion between the piston raises the temperature of the gases therein and moves the pistons apart. The upward movement of the piston 16 drives more air down around its sides to the point of combustion in the interior of the main cylinder. It will thus be seen that the downward flowing current of air around the piston 16 forms a curtain for the protection of the cylinder walls from the burning gases during the entire combustion period which will probably be about one eighth of the time of the working stroke.

As it will be desirable to deliver the fuel to the combustion chamber, the main cylinder, in a shorter time when the engine is running rapidly than when it is running slowly. The pressure above the extension piston 37 which is the same as the pressure in chamber 28 and in the slot 31, all being connected. The valve 36 is dropped when the wall 35 of the shank 17 moves downward at the end of the power stroke. As this valve moves by the force of gravity only it moves more slowly than shank 17, and registers its port with the port 31 opening into the chamber 34 at a relatively later moment than when the pistons are moving slowly. The pressure in chamber 28 and slot 31 will therefore be lower than if the registration had occurred before the piston 16 had so nearly reached its lowest point. If the pressure in chamber 28 is at the time of registration below atmospheric there will be a flow of air from chamber 34 to chamber 28 and the pressure in that chamber will be increased by the additional air therein at the next firing stroke. If the registration is relatively early, that is if the pistons are moving slowly and the valve 36 follows the piston closely, the pressure in 28 will be high and air will flow out of that chamber to chamber 34.

It should be observed that if the piston 10 is moving slowly it will uncover the port 45 slowly and release the pressure in the main cylinder slowly and therefore piston 16 will start downward slowly.

If desired valves 72 may be provided in the shoulders 8 and operated by suitable mechanical mechanism from the crank shaft or automatically so as to permit compression above the piston 16 when moving from the position shown in Figure 2 to the position shown in Figure 1 and to allow the intake of air on the scavenging stroke of piston 16 through the valves 72.

Figure 8 I have shown a dash pot like mechanism for checking the downward movement of the piston 15 to be prevented from striking against the piston 10. This mechanism comprises a dash pot 75 with the plunger 76 therein carried by a stem 77 from the piston 15. The dash pot 75 has an air pipe outlet as at 78 valve control. The plunger is provided with a connecting rod 79 operable on the crank 80 of the crank shaft 48.

It is thought that the construction, operation, and advantages of the invention will now be clearly understood by those skilled in this art without a more detailed description thereof.

The present embodiment of the invention has been disclosed in detail, merely by way of example, since in actual practice it attains the features of advantages enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a two cycle internal combustion engine, a cylinder reduced to provide a shoulder and a cylinder extension, a power piston in the cylinder, a loose piston in the cylinder having a shank with a piston fit within the extension, said shank having a longitudinally extending bore, a pressure piston in the bore having a longitudinally extending conduit therein for connection with a source of fuel, a check valve in the conduit, an abutment projecting from the pressure piston, said shank having a compartment in which said abutment is operable, and means for creating an air pressure behind the abutment to cause compression by the pressure piston.

2. In a two cycle internal combustion engine, a cylinder reduced to provide a shoulder and a cylinder extension, a power piston in the cylinder, a loose piston in the cylinder having a shank with a piston fit within the extension, said shank having a longitudinally extending bore, a pressure piston in the bore having a longitudinally extending conduit therein for connection with a source of fuel, a check valve in the conduit, a floating piston in the bore, said shank having a laterally extending opening closable by the floating piston, said pressure piston having a lateral abutment, said shank having a compartment for receiving the abutment, and means for delivering air through the transverse conduit between the floating piston and the power piston and creating an air pressure behind the abutment to cause the movement of the pressure piston toward the floating piston to close the floating piston over the transverse conduit and to cause compression by the pressure piston.

3. In a two cycle internal combustion engine, a cylinder reduced to provide a shoulder and a cylinder extension, a power piston in the cylinder, a loose piston in the cylinder having a shank with a piston fit within the extension, said shank having a longitudinally extending bore, a pressure piston in the bore having a longitudinally extending conduit therein for connection with a source of fuel, a check valve in the conduit, and means for creating an air pressure to cause compression by the pressure piston, said cylinder having exhaust ports, a plate on the head of the piston in spaced relation thereto.

4. In a two cycle internal combustion engine, a cylinder reduced to provide a shoulder and a cylinder extension, a power piston in the cylinder, a loose piston in the cylinder having a shank with a piston fit within the extension, said shank having a longitudinally extending bore, a pressure piston in the bore having a longitudinally extending conduit therein for connection with a source of fuel, a check valve in the conduit, and means for creating an air pressure to cause compression by the pressure piston, said cylinder having exhaust ports, a plate on the head of the piston in spaced relation thereto, said scavenging piston having conduits leading from the upper surface thereof downwardly and toward the center thereof, said shank having a longitudinally extending channel, said extension having an opening communicating with a source of air under pressure, the channel registering with the opening and adapted to be communicated with the cylinder when the loose piston is part way down so that a current of air will pass through the conduit in the loose piston for cooling purposes and air for a fresh charge in the cylinder.

5. In a two cycle internal combustion engine, a cylinder reduced to provide a shoulder and a cylinder extension, a power piston in the cylinder, a loose piston in the cylinder having a shank with a piston fit within the extension, said shank having a longitudinally extending bore, a pressure piston in the bore having a longitudinally extending conduit therein for connection with a source of fuel, a check valve in the conduit, and means for creating an air pressure to cause compression by the pressure piston, said cylinder having exhaust ports, a plate on the head of the piston in spaced relation thereto, said loose piston having conduits leading from the upper surface thereof downwardly and toward the center thereof, said shank having a longitudinally extending channel, said extension having an opening communicating with a source of air under pressure, the channel registering with the opening and adapted to be communicated with the cylinder when the loose piston is part way down so that a current of air will pass through the conduit in the loose piston for cooling purposes, and for changing the piston for a new explosion, the cylinder being provided with an annular air chamber having openings leading interiorly of the cylinder at the upper end thereof to receive said air current as the loose piston moves upwardly.

6. In a two-cycle internal combustion engine, a cylinder reduced to provide a shoulder and a cylinder extension and having an exhaust, a power piston in the cylinder, a loose piston in the cylinder with a space between it and the cylinder wall and having a shank with a piston fit within the extension, said shank having a longitudinally extending bore, a pressure piston in said bore having a longitudinally extending conduit therein for connection with a source of fuel, a check valve in the conduit, and means for creating an air pressure to cause compression by the pressure piston.

7. In a two-cycle internal combustion engine, a cylinder reduced to provide a shoulder and a cylinder extension and having an exhaust, a power piston in the cylinder, a loose piston in the cylinder with a space between it and the cylinder wall for the passage of fluid and having a shank with a piston fit within the extension, said shank with a longitudinal bore and an air passage, means for supplying fluid under pressure to said passage, a pressure piston in the bore having a longitudinal conduit therein for connection with a source of fuel, and a check valve in the conduit.

8. In a two-cycle internal combustion engine, a cylinder reduced to provide a shoulder and a cylinder extension and having an exhaust, a power piston in the cylinder, a loose piston in the cylinder with a space between it and the cylinder wall for the passage of fluid and having a shank with a piston fit within the extension, said shank with a longitudinal bore and an air passage, means for supplying fluid under pressure to said passage, a pressure piston in the bore having a longitudinal conduit therein for connection with a source of fuel, and a check valve in the conduit; the cylinder also having a chamber in its wall between the shoulder and the exhaust and communicating adjacent to the shoulder with the interior of the cylinder.

In testimony whereof I affix my signature.

WALTER B. SANDS.